(12) United States Patent
Yoon et al.

(10) Patent No.: US 11,043,689 B2
(45) Date of Patent: Jun. 22, 2021

(54) ELECTRODE ASSEMBLY, AND RECHARGEABLE BATTERY COMPRISING SAME

(71) Applicant: Samsung SDI Co., Ltd., Yongin-si (KR)

(72) Inventors: Dongsik Yoon, Yongin-si (KR); Yiseop Ahn, Yongin-si (KR); Hoyong An, Yongin-si (KR); Junghyun Lee, Yongin-si (KR); Myungduk Lim, Yongin-si (KR); Hyesun Jung, Yongin-si (KR); Seung-Hun Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 192 days.

(21) Appl. No.: 16/326,592

(22) PCT Filed: Aug. 16, 2017

(86) PCT No.: PCT/KR2017/008857
§ 371 (c)(1),
(2) Date: Feb. 19, 2019

(87) PCT Pub. No.: WO2018/038448
PCT Pub. Date: Mar. 1, 2018

(65) Prior Publication Data
US 2019/0229362 A1      Jul. 25, 2019

(30) Foreign Application Priority Data

Aug. 24, 2016  (KR) .................. 10-2016-0107852

(51) Int. Cl.
*H01M 4/02* (2006.01)
*H01M 10/04* (2006.01)
(Continued)

(52) U.S. Cl.
CPC ..... *H01M 10/0431* (2013.01); *H01M 4/0404* (2013.01); *H01M 4/66* (2013.01);
(Continued)

(58) Field of Classification Search
CPC ...................................................... H01M 4/02
See application file for complete search history.

(56) References Cited

U.S. PATENT DOCUMENTS 6,325,611 B1    12/2001  Iwasaki et al.
2006/0003221 A1  1/2006  Yeo
(Continued)

FOREIGN PATENT DOCUMENTS

EP    2 680 361 A1   1/2014
EP    2 919 311 A1   9/2015
(Continued)

OTHER PUBLICATIONS

Extended European Search Report for corresponding European Patent Application No. 17843868.5, dated Mar. 3, 2020, 7 pages.

*Primary Examiner* — Jacob B Marks
(74) *Attorney, Agent, or Firm* — Lewis Roca Rothgerber Christie LLP

(57) ABSTRACT

An embodiment of the present invention provides an electrode assembly in which a first electrode having a first electrode coated region and a first electrode uncoated region, a separator, and a second electrode having a second electrode coated region and a second electrode uncoated region are stacked and wound around a winding axis, wherein the first electrode coated region may include a first substrate, a first small electrode portion including first active material layers formed on both surfaces of the first substrate, and a second small electrode portion including a first active material layer formed on the other surface of the first substrate in which one surface thereof is exposed, and the second small (Continued)

electrode portion may be positioned at a first curved portion formed by first winding of the electrode assembly.

18 Claims, 7 Drawing Sheets

(51) Int. Cl.
- *H01M 10/0587* (2010.01)
- *H01M 50/531* (2021.01)
- *H01M 4/04* (2006.01)
- *H01M 4/66* (2006.01)
- *H01M 10/0525* (2010.01)

(52) U.S. Cl.
CPC ....... *H01M 10/04* (2013.01); *H01M 10/0525* (2013.01); *H01M 10/0587* (2013.01); *H01M 50/531* (2021.01)

(56) References Cited

U.S. PATENT DOCUMENTS

| | | | |
|---|---|---|---|
| 2009/0317713 A1 | 12/2009 | Kim et al. | |
| 2013/0040188 A1* | 2/2013 | Zinck ................ | H01M 10/0525 429/163 |
| 2014/0141303 A1 | 5/2014 | Matsushita et al. | |
| 2014/0178729 A1 | 6/2014 | Chung et al. | |
| 2015/0340732 A1* | 11/2015 | Kim .................... | H01M 10/058 429/94 |

FOREIGN PATENT DOCUMENTS

| | | | |
|---|---|---|---|
| JP | 11-111327 A | | 4/1999 |
| JP | 2000-67907 A | | 3/2000 |
| JP | 2003-257406 | * | 9/2003 |
| JP | 2003-257406 A | | 9/2003 |
| JP | 2010-192193 A | | 9/2010 |
| KR | 10-2005-0121509 A | | 12/2005 |
| KR | 10-2009-0132500 A | | 12/2009 |

* cited by examiner

ELECTRODE ASSEMBLY, AND RECHARGEABLE BATTERY COMPRISING SAME

CROSS-REFERENCE TO RELATED APPLICATION(S)

This application is a National Phase Patent Application of International Patent Application Number PCT/KR2017/008857, filed on Aug. 16, 2017, which claims priority of Korean Patent Application No. 10-2016-0107852, filed Aug. 24, 2016. The entire contents of both of which are incorporated herein by reference.

TECHNICAL FIELD

The present invention relates to an electrode assembly, and more particularly, to an electrode assembly for a rechargeable battery, and a rechargeable battery including the electrode assembly.

BACKGROUND ART

A rechargeable battery is a power storage system that converts electrical energy into chemical energy to store it with excellent energy density. Unlike a primary battery that cannot be recharged, since the rechargeable battery can be recharged, it is widely used in information technology (IT) devices such as a smartphone, a laptop computer, a tablet computer, and the like.

Recently, interest in electric cars has been increasing due to problems such as environment degradation and fossil fuel depletion, and such a rechargeable battery is used as a battery of the electric vehicle. According to such a trend, it is required for the rechargeable battery to have characteristics such as high energy density, high power, high safety, etc.

As types of the rechargeable battery, a lead-acid battery, a nickel-cadmium battery, a nickel hydrogen battery, a lithium ion battery, a lithium polymer battery, a lithium metal battery, a lithium air battery, a sodium air battery, etc., are included. A rechargeable battery using lithium has a higher operating voltage and higher energy density per unit weight than other rechargeable batteries, such that it is increasingly applied to the portable IT devices and the electric vehicles.

When a short circuit occurs therein due to strong reactivity of the lithium in the lithium-based rechargeable battery, since combustion and explosion may occur, a safe structure in which a short circuit between electrodes may not occur even though changing/discharge are repeatedly performed is required. An electrode assembly structure of the rechargeable battery of which safety may be ensured and which may be rapidly manufactured is being developed.

Of well-known structures, first, there is an electrode assembly structure of a spiral-wound type in which positive and negative electrodes with a separation membrane therebetween are rolled, and second, there is an electrode assembly structure of a stack type in which positive and negative electrodes cut to be fitted to a size of the battery are alternately stacked with a separation membrane therebetween.

The positive electrode and negative electrode of the electrode assembly are formed by disposing an active material layer on a substrate, and a thickness of the active material layer of the positive electrode is greater than that of the active material layer of the negative electrode. Accordingly, when the electrode assembly of the winding structure is manufactured, since a radius of rotation becomes small as it is adjacent to a winding axis thereof, cracks are generated in the electrodes, thereby deteriorating characteristics and yield of the battery.

DISCLOSURE

Technical Problem

One aspect of the present invention is to provide an electrode assembly and a rechargeable battery including the electrode assembly, which may minimize occurrence of cracks even if a radius of rotation is small adjacent to an winding axis.

Another aspect of the present invention is to provide an electrode assembly and a rechargeable battery including the electrode assembly, which may improve electrical characteristics by minimizing Li precipitation.

Technical Solution

An embodiment of the present invention provides an electrode assembly in which a first electrode having a first electrode coated region and a first electrode uncoated region, a separator, and a second electrode having a second electrode coated region and a second electrode uncoated region are stacked and wound around a winding axis, wherein the first electrode coated region may include a first substrate, a first small electrode portion including first active material layers formed on both surfaces of the first substrate, and a second small electrode portion including a first active material layer formed on the other surface of the first substrate in which one surface thereof is exposed, and the second small electrode portion may be positioned at a first curved portion formed by first winding of the electrode assembly.

The electrode assembly may further include a first flat portion positioned between the first curved portion and the first electrode uncoated region, and the second small electrode portion may further include an extension electrode portion extending from the first curved portion and positioned in the first flat portion.

The second electrode coated region may include a second substrate, a third small electrode portion including second active material layers formed on both surfaces of the second substrate, and a fourth small electrode portion including the second active material layer formed on the other surface of the second substrate in which one surface thereof is exposed.

The fourth small electrode portion may face the extension electrode portion.

The first active material layer of the second small electrode portion may overlap the second substrate of the fourth small electrode portion with the separator therebetween.

Another embodiment of the present invention provides an electrode assembly in which a first electrode having a first electrode coated region and a first electrode uncoated region, a separator, and a second electrode having a second electrode coated region and a second electrode uncoated region are stacked and wound around a winding axis, wherein the first electrode coated region may include a first substrate and a first active material layer formed on at least one surface of the first substrate, and the first electrode coated region is positioned at a first curved portion formed by first winding of the electrode assembly and the first substrate facing the winding axis may be exposed.

The electrode assembly may further include a first flat portion positioned between the first curved portion and the first electrode uncoated region, and the first substrate positioned at the first flat portion may be exposed.

The second electrode coated region may include a second substrate and a second active material layer formed on at least one surface of the second substrate, and the second electrode coated region may be positioned at a second curved portion formed by first winding of the second electrode coated region, and the second substrate facing the winding axis may be exposed.

A loading level of the first electrode may be 40 mg/cm$^2$, a length of the second small electrode portion may be 1 mm to 4 mm, and a thickness of the first electrode may be 60 μm to 80 μm.

A current density of the first electrode may be 3.5 mA/cm$^2$.

The first electrode may be a positive electrode, and the second electrode may be a negative electrode.

A rechargeable battery according to another embodiment of the present invention includes the above-mentioned electrode assembly, and a case for accommodating an electrolyte solution together with the electrode assembly.

Advantageous Effects

According to the embodiment of the present invention, it is possible to provide a rechargeable battery which is excellent in battery characteristics because a crack does not occur even if a radius of rotation is small adjacent to a winding axis.

In addition, according to the embodiment of the present invention, it is possible to provide a rechargeable battery that may prevent deterioration of battery characteristics due to precipitation of Li in a winding core portion.

MODE FOR INVENTION

Figure 1:
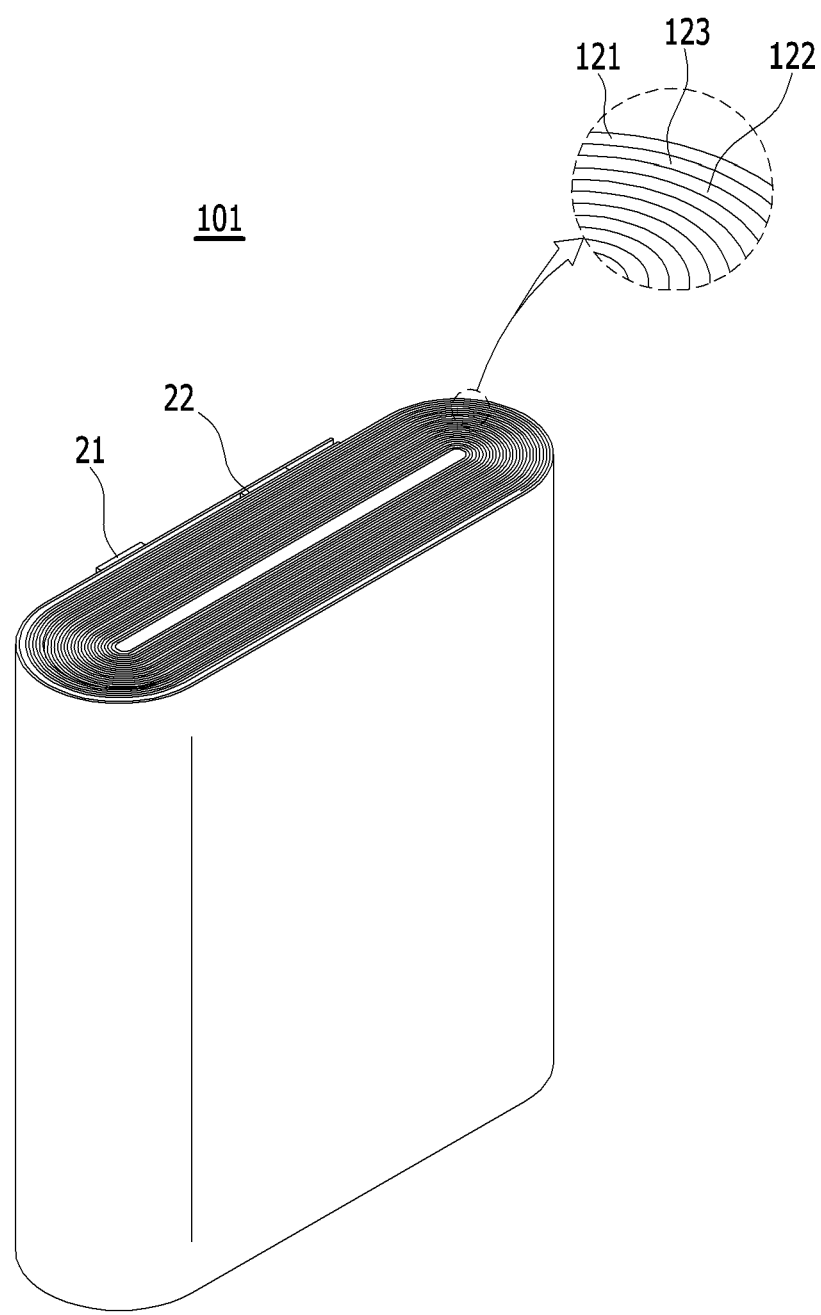
FIG. 1 illustrates a schematic perspective view of an electrode assembly for a rechargeable battery according to an embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "indirectly coupled" to the other element through a third element. In addition, unless explicitly described to the contrary, the word "comprise" and variations such as "comprises" or "comprising" will be understood to imply the inclusion of stated elements but not the exclusion of any other elements.

Figure 2:
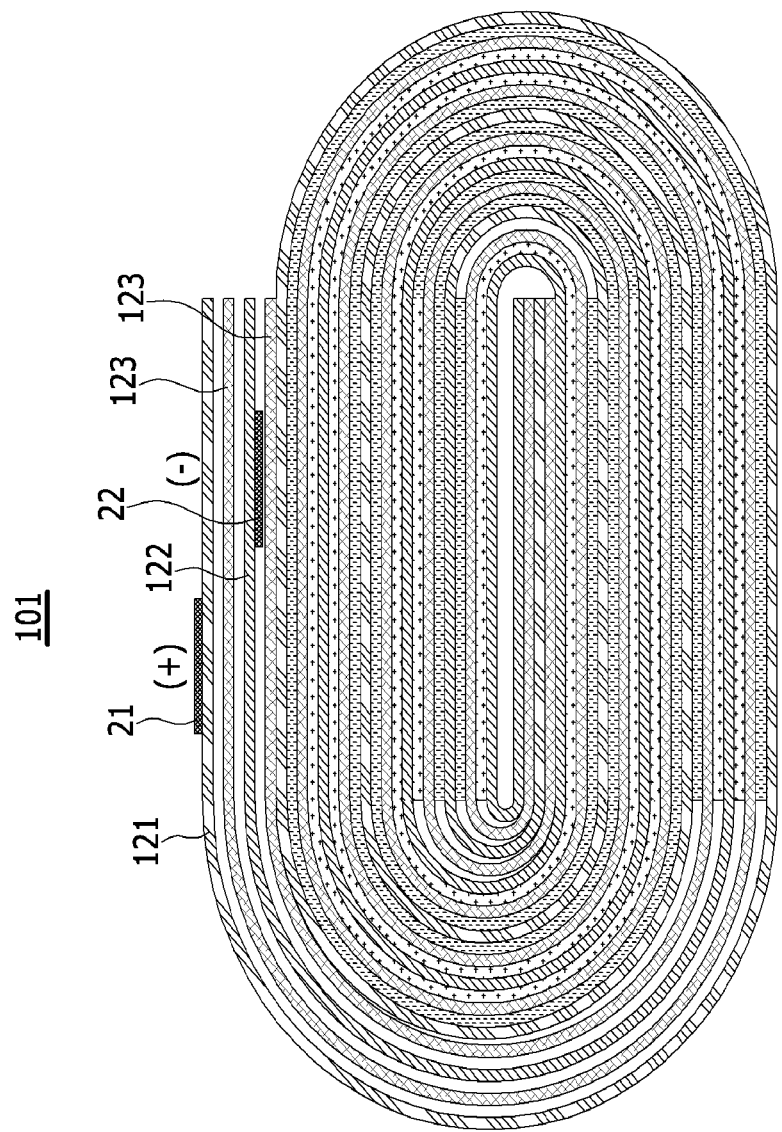
FIG. 2 illustrates a schematic transverse cross-sectional view of the electrode assembly of FIG. 1.
Figure 3:
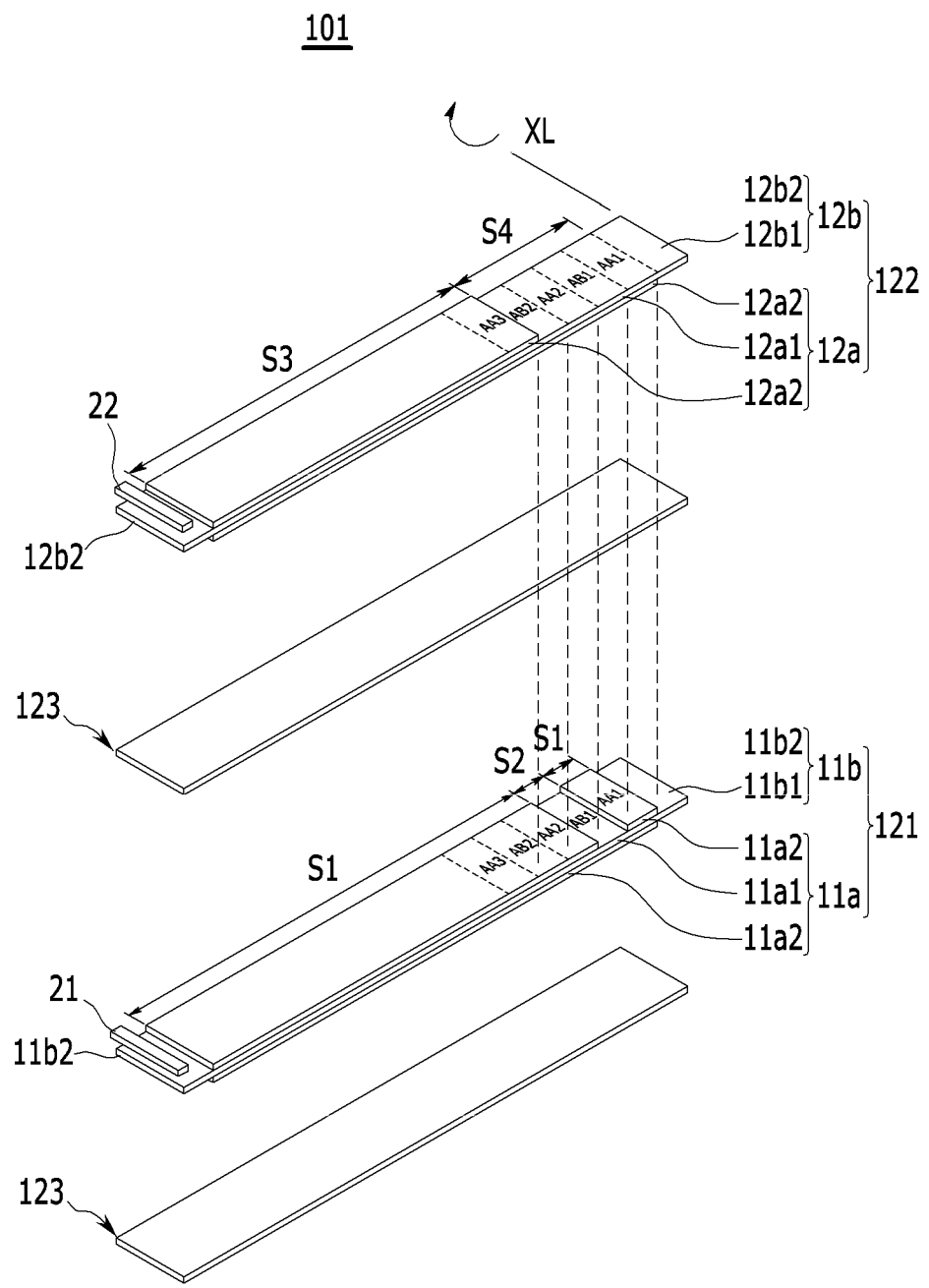
FIG. 3 illustrates an exploded perspective view of the electrode assembly of FIG. 1.

FIG. 1 illustrates a schematic perspective view of an electrode assembly for a rechargeable battery according to an embodiment of the present invention, FIG. 2 illustrates a schematic transverse cross-sectional view of the electrode assembly of FIG. 1, and FIG. 3 illustrates an exploded perspective view of the electrode assembly of FIG. 1.

As shown in FIG. 1 to FIG. 3, an electrode assembly 101 according to an embodiment of the present invention includes a first electrode 121, a second electrode 122, and a separator 123 positioned between the first electrode and the second electrode. The separator 123 is for insulation, and the first electrode 121, the separator 123, the second electrode 122, and the separator 123 may be stacked in this order.

The electrode assembly 101 in which the first electrode 121, the separator 123, and the second electrode 122 are stacked may have a jellyroll shape being spirally wound based on a winding axis XL. If necessary, the electrode assembly 101 may be pressed to be flat after being spirally wound, and it may have a shape with an oval cross-section.

The first electrode 121 includes a first electrode coated region 11a and a first electrode uncoated region 11b, and the second electrode 122 includes a second electrode coated region 12a and a second electrode uncoated region 12b.

The first electrode coated region 11a includes a first small electrode portion S1 and a second small electrode portion S2 that include a first substrate 11a1 and a first active material layer 11a2 formed on at least one surface of the first substrate 11a1, and the second electrode coated region 12a includes a third small electrode portion S3 and a fourth small electrode portion S4 that include a second substrate 12a1 and a second active material layer 12a2 formed on at least one surface of the second substrate 12a1.

The first small electrode portion S1 includes the first substrate 11a1 and the first active material layer 11a2 formed on both surfaces of the first substrate 11a1, and the second small electrode portion S2 includes the first substrate 11a1 and the first active material layer 11a2 formed on one surface of the first substrate 11a1. The third small electrode portion S3 includes the second substrate and the second active material layer 12a2 formed on both surfaces of the second substrate 12a1, and the fourth small electrode portion S4 includes the second substrate 12a1 and the second active material layer 12a2 formed on one surface of the second substrate 12a1. The first substrate 11a1 and the second substrate 12a1 may be formed of a band-shaped metal foil.

Each of lengths of the second small electrode portion S2 and the fourth small electrode portion S4 may be 4 mm or less, and preferably 1 mm to 4 mm. When the lengths of the second small electrode portion S2 and the fourth small electrode portion S4 are less than 1 mm, a process error may occur, and when they are greater than 4 mm, the battery capacity may be reduced.

The first substrate 11a1 provides a moving path of charges generated in the first active material layer 11a2 and supports the first active material layer 11a2. For example, the first electrode 121 may be a positive electrode, and the first substrate 11a1 may include aluminum.

The first active material layer 11a2 may be formed by dispersing an electrode active mass including an electrode active material, a binder, a conductor, and the like in a solvent to form a slurry, applying it to at least one surface of the first substrate 11a1, and then drying and compressing it.

A current density of the first electrode 121 is 3.5 mA/cm$^2$ or more, and a thickness thereof may be 60 μm or more and 80 μm or less.

The second substrate 12a1 provides a moving path of charge generated in the second active material layer 12a2 and supports the second active material layer 12a2. For example, the second electrode 122 may be a negative electrode, and the second substrate 12a1 may include copper.

The second active material layer 12a2 may be formed by dispersing an electrode active mass including an electrode active material, a binder, a conductor, and the like in a solvent to form a slurry, applying it to at least one surface of the second substrate 12a1, and then drying and compressing it.

The first electrode uncoated region 11b and the second electrode uncoated region 12b do not include an active material layer and are integrally formed with the first substrate 11a1 or the second substrate 12a1, and they may be portions at which the first substrate 11a1 of the first electrode coated region 11a and the second substrate 12a1 of the second electrode coated region 12a extend.

The first electrode uncoated region 11b may be positioned at opposite sides of the first active material layer 11a2, and a first electrode current collecting portion 21 for drawing charges generated by chemical reaction to the outside may be connected to either of the first electrode uncoated regions 11b. The first electrode current collecting portion 21 may be connected to the first electrode uncoated region 11b by ultrasonic welding. The first electrode current collecting portion 21 may include aluminum like the first substrate 11a1.

A thickness of the first electrode current collecting portion 21 may be 12 μm or less.

The second electrode uncoated region 12b may be positioned at both sides of the second active material layer 12a2, and a second electrode current collecting portion 22 for drawing charges generated by chemical reaction to the outside may be connected to either of the first electrode uncoated regions 12b. The second electrode current collecting portion 22 may be connected to the second electrode uncoated region 12b by ultrasonic welding. The second electrode current collecting portion 22 may include nickel.

Since the first electrode uncoated region 11b and the second electrode uncoated region 12b are positioned at both sides of the first active material layer 11a2 and the second active material layer 12a2, respectively, when the first and second electrodes 122 are wound based on the winding axis XL, electrode uncoated regions adjacent to the winding axis XL are referred to as center uncoated regions 11b1 and 12b1, and electrode uncoated regions positioned relatively far away from the winding axis XL are referred to as outer uncoated regions 11b2 and 12b2.

Although it is illustrated that the first electrode current collecting portion 21 and the second electrode current collecting portion 22 are connected to the outer uncoated regions 11b2 and 12b2, the present invention is not limited thereto, and if necessary, the first electrode current collecting portion 21 and the second electrode current collecting portion 22 may be connected to the central uncoated regions 11b1 and 12b1, or may be connected to the central uncoated regions 11b1 and 12b1 and the outer uncoated regions 11b2 and 12b2, respectively. In this case, after being wound, the first electrode current collecting portion 21 and the second electrode current collecting portion 22 are spaced apart from each other so as to not be short-circuited.

The separator 123 is positioned between the first electrode 121 and the second electrode 122, and prevents a short circuit therebetween.

The separator 123 may be formed of a porous film having high ion permeability and mechanical strength. For example, it may be formed of an olefin-based polymer such as polyethylene or polypropylene. The separator is formed to extend more along a longitudinal direction or along a width direction than the first electrode coated region 11a or the second electrode coated region 12a, thus it is possible to prevent a short circuit between the first electrode coated region 11a and the second electrode coated region 12a due to thermal contraction.

The electrode assembly 101 may be formed by winding the first electrode 121, the separator 123, and the second electrode 122 repeatedly around the winding axis XL, and then pressing it. In this case, a loading level LL may be 40 mg/cm$^2$ or more. The electrode assembly 101 may have an elliptical cross-section cut in a vertical direction across the winding axis XL in one direction.

Therefore, the electrode assembly 101 includes a relatively planar flat portion and a relatively rounded curved portion in a cross-section. The flat portion may be a pressed portion after winding the electrode assembly 101, and the curved portion may connect two flat portions facing each other. For convenience of explanation, the flat portions are referred to as AA1, AA2, AA3, . . . , and the curved portions are referred to as AB1 and AB2, in order from a center uncoated region.

On the other hand, the second small electrode portion S2 is positioned at the first curved portion AB1, and the first substrate 11a1 exposed in the second small electrode portion S2 faces the winding axis. In this case, when the electrode assembly 101 is formed by repeatedly winding the first electrode, the separator, and the second electrode around the winding axis, the first curved portion AB1 corresponds to a curved portion formed by first winding of the first electrode coated region 11a and the second electrode coated region 12a.

Therefore, the outer uncoated region 11b2 of the first electrode solid portion 11b and the outer solid portion 12b2 of the second electrode solid portion 12b, which are relatively far from the winding axis XL, may be positioned at the outermost edge of the electrode assembly 101.

When the second small electrode portion is formed as in the embodiment of the present invention, the first electrode active material layer having a relatively large thickness is formed on only one surface of the substrate, thereby reducing the thickness of the second small electrode portion.

By positioning the second small electrode portion at the first curved portion having the smallest turning radius, stress applied during the rotation may be reduced. Therefore, cracks that may occur due to the small radius of rotation of the first curved portion are minimized, thus a high-density and high-current density battery having excellent characteristics may be provided. In addition, it is possible to reduce the phenomenon in which the active material layer is separated from the first curved surface portion, thereby reducing capacity decrease due to the separation of the active material layer.

Figure 4:
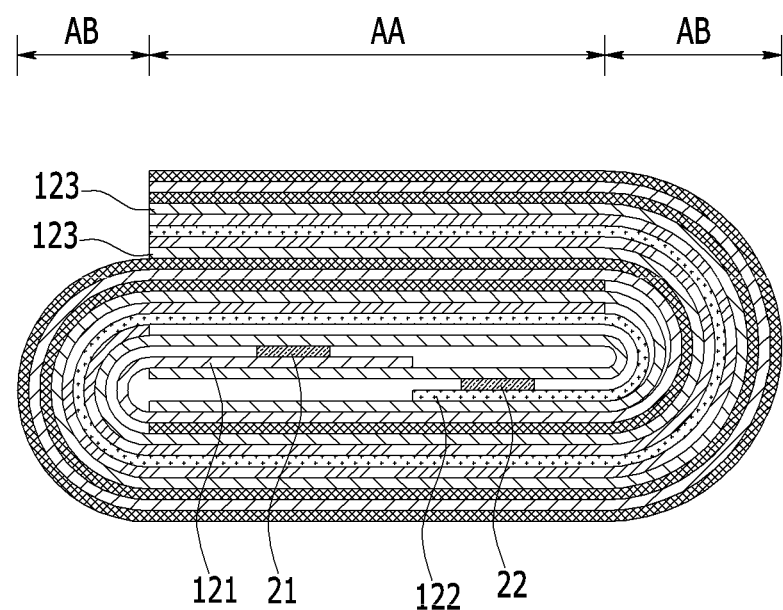
FIG. 4 illustrates a schematic transverse cross-sectional view of an electrode assembly according to another embodiment of the present invention.
Figure 5:
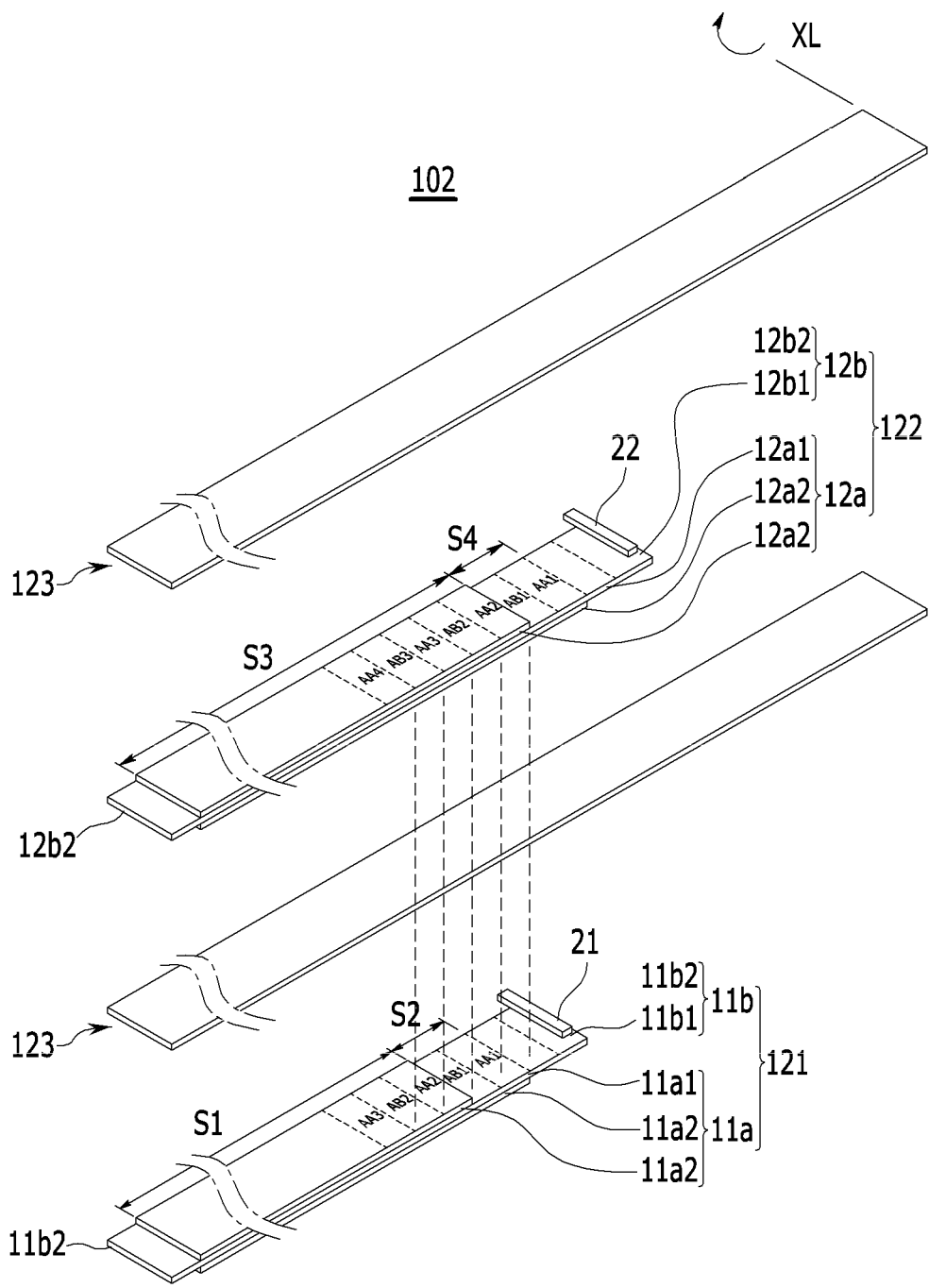
FIG. 5 illustrates an exploded perspective view of the electrode assembly of FIG. 4.

FIG. 4 illustrates a schematic transverse cross-sectional view of an electrode assembly according to another embodiment of the present invention, and FIG. 5 illustrates an exploded perspective view of the electrode assembly of FIG. 4.

Since the electrode assemblies shown in FIG. 4 and FIG. 5 are almost the same as those shown in FIG. 2 and FIG. 3, only different parts will now be described in detail.

As shown in FIG. 4 and FIG. 5, the electrode assembly 102 according to another embodiment of the present invention includes the first electrode 121, the second electrode 122, and the separator 123 positioned between the first electrode 121 and the second electrode 122, and it has a jellyroll shape being spirally wound based on the winding axis.

The electrode assembly 102 may be formed by repeatedly winding the first electrode 121, the separator 123, and the second electrode 122 around the winding axis XL, and then pressing it, and it may have an elliptical cross-section cut in a direction perpendicular to the winding axis XL. Therefore, the electrode assembly 102 includes a relatively planar flat portion and a relatively rounded curved portion in a cross-section. The flat portion may be a pressed portion after winding the electrode assembly 102, and the curved portion may connect two flat portions facing each other.

The first electrode coated region 11a includes the first small electrode portion S1 including the first substrate 11a1 and the first active material layer 11a2 formed on both surfaces of the first substrate 11a1, and the second small electrode portion S2 including the first substrate 11a1 and the first active material layer 11a2 formed on one surface of the first substrate 11a1. The second electrode coated region 12a includes the third small electrode portion S3 including the second substrate 12a1 and the second active material layer 12a2 formed on both surfaces of the second substrate 12a1, and the fourth small electrode portion S4 including the second substrate 12a1 and the second active material layer 12a2 formed on one surface of the second substrate 12a1.

The second small electrode portion S2 may be positioned at the first curved portion AB1, and the second small electrode portion S2 may further include an extension electrode portion, which may extend from the first curved portion AB1 and be positioned at the first flat portion AA1.

In addition, the fourth small electrode portion S4 may be positioned on the first flat portion AA1. Accordingly, the second small electrode portion S2 and the fourth small electrode portion S4 positioned at the first flat portion are positioned at opposite sides with respect to the center uncoated region to face each other.

As in the embodiment of the present invention, when the second active material layer is formed on only one surface of the second small electrode portion, it is possible to reduce occurrence of non-uniform thickness due to the relatively greater thickness than the first active material layer.

In addition, by positioning the second small electrode portion and the fourth small electrode portion to face each other, Li precipitation in the winding portion may be minimized.

The electrode assembly described above may be an electrode assembly for a rechargeable battery, and hereinafter, a rechargeable battery including the electrode assembly described above will be described with reference to the accompanying drawings.

Figure 6:
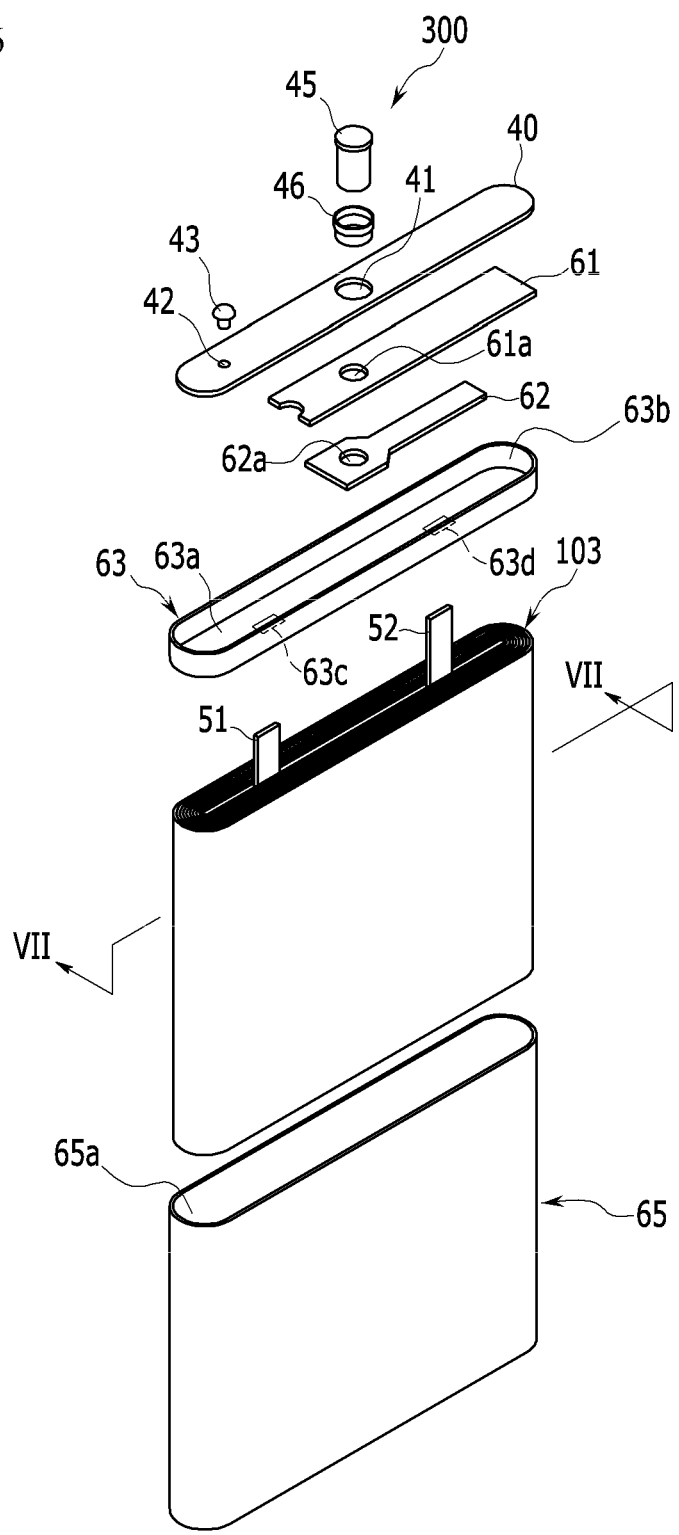
FIG. 6 illustrates an exploded perspective view of a rechargeable battery according to an embodiment of the present invention.
Figure 7:
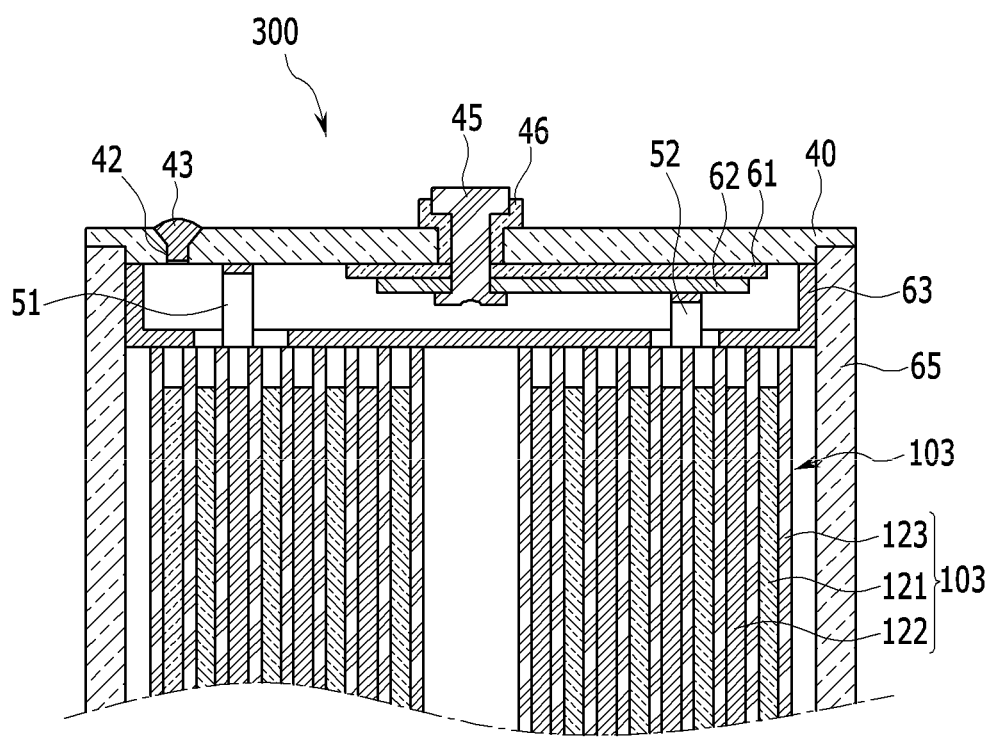
FIG. 7 illustrates a cross-sectional view taken along line VII-VII of FIG. 6.

FIG. 6 illustrates an exploded perspective view of a rechargeable battery according to an embodiment of the present invention, and FIG. 7 illustrates a cross-sectional view taken along line VII-VII of FIG. 6.

As shown in FIG. 6 and FIG. 7, a rechargeable battery 300 according to an embodiment of the present invention includes an electrode assembly 103, a case 65, and a cap plate 40. Hereinafter, a metal case will be described as an example, but the present invention is not limited thereto, and the present invention may be applied to various types of batteries such as a pouch type of battery and the like.

The electrode assembly 103 may be the electrode assembly shown in FIG. 1 to FIG. 5, and includes the first electrode 121, the second electrode 122, and the separator 123. The first electrode 121 and the second electrode 122 interpose the separator 123 acting as an insulator therebetween, and are then wound in a jelly-roll shape.

The first electrode 121 may be a positive electrode, and the second electrode 122 may be a negative electrode.

In this case, a positive electrode current collecting portion 51 is fixed to the positive electrode, and a negative electrode current collecting portion 52 is fixed to the negative electrode. The positive electrode current collecting portion 51 and the negative electrode current collecting portion 52 are disposed so as to be parallel to the winding axis, and are exposed at a cross-sectional portion of the electrode assembly 103 of which a layer is exposed.

The positive electrode current collecting portion 51 and the negative electrode current collecting portion 52 protrude in a direction in which an opening 65a is formed in the case 65, and are disposed so as to be spaced apart from each other by a predetermined distance to be electrically insulated.

The positive electrode current collecting portion 51 is made of an electrically conductive material such as nickel or aluminum, and is electrically connected to the cap plate 40. The negative electrode current collecting portion 52 is made of an electrically conductive material such as nickel or copper and is electrically connected to a terminal 45.

The case 65 is provided with the opening 65a at its upper end to accommodate the electrode assembly 103. The case 65 provides a space for accommodating the electrode assembly 103 and an electrolyte solution, and is electrically connected to the positive electrode current collecting portion 51. The case 65 may be manufactured by processing aluminum or an aluminum alloy with a method such as metal deep drawing.

The cap plate 40 is combined to the opening 65a of the case 65 to close and seal the case 65, and is made of an electrically conductive metallic material such as aluminum or an aluminum alloy. The positive electrode current collecting portion 51 is bonded to a bottom surface of the cap plate 40 by welding to positively charge the cap plate 40.

An insulating case 63 is disposed between the electrode assembly 103 and the cap plate 40. The insulating case 63 includes a base 63a and a lateral wall 63b protruding from a lateral end of the base 63a. The base 63a is formed to have a plate shape, and is provided with a first current collecting hole 63c through which the positive current collecting portion 51 penetrates, and a second current collecting hole 63d through which the negative current collecting portion 52 penetrates. The lateral wall 63b is formed along a periphery of the base 63a.

The terminal 45 is positioned at a center of the cap plate 40, and passes through a terminal hole 41 formed in the cap plate 40. The terminal 45 is disposed at the cap plate 40 via an insulating gasket 46, and the insulating gasket 46 surrounds the terminal 45 to electrically insulate the terminal 45 from the cap plate 40.

The cap plate 40 is provided with an electrolyte injecting hole 42 which is a passage for injecting an electrolyte into the case 65, and a plug 43 is inserted into the electrolyte injecting hole 42 to close the electrolyte injecting hole 42.

The terminal 45 penetrates the cap plate 40 and a connecting plate 62, and the connecting plate 62 is disposed between the electrode assembly 103 and the cap plate 40 inside the case 65. The connecting plate 62 is formed to have a plate shape, and the connecting plate 62 is provided with a terminal hole 62a through which the terminal 45 passes.

The terminal 45 is fixed to the cap plate 40 and the connecting plate 62 by riveting while penetrating the cap plate 40 and the connecting plate 62. The negative current collecting portion 52 is welded to the connecting plate 62, and accordingly the terminal 45 may be electrically connected with the negative electrode 122 through the connecting plate 62 and the negative current collecting portion 52.

An insulating plate 61 is provided between the cap plate 40 and the connecting plate 62 to insulate the connecting plate 62 from the cap plate 40. The insulating plate 61 is made of a plate having an electrical insulation property, and is disposed to be parallel to the cap plate 40. The insulating plate 61 is provided with a terminal hole 61a through which the terminal 45 passes.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

The invention claimed is:

1. A electrode assembly in which a first electrode having a first electrode coated region and a first electrode uncoated region, a separator, and a second electrode having a second electrode coated region and a second electrode uncoated region are stacked and wound around a winding axis, wherein the first electrode coated region includes a first substrate, a first small electrode portion including first active material layers formed on two surfaces of the first substrate, and a second small electrode portion including a first active material layer formed on one of the two surfaces of the first substrate and the other of the two surfaces being exposed, and
   the second small electrode portion is positioned at a first curved portion formed by a first winding of the electrode assembly,
   wherein the electrode assembly further includes a first flat portion positioned between the first curved portion and the first electrode uncoated region, and
   wherein the second small electrode portion further includes an extension electrode portion extending from the first curved portion and positioned in the first flat portion.

2. The electrode assembly of claim 1, wherein
   the second electrode coated region includes a second substrate, a third small electrode portion including second active material layers formed on two surfaces of the second substrate, and
   a fourth small electrode portion including the second active material layer formed on one of the two surfaces of the second substrate and the other of the two surfaces being exposed.

3. The electrode assembly of claim 2, wherein
   the fourth small electrode portion faces the extension electrode portion.

4. The electrode assembly of claim 2, wherein
   the first active material layer of the second small electrode portion overlaps the second substrate of the fourth small electrode portion with the separator therebetween.

5. A electrode assembly in which a first electrode having a first electrode coated region and a first electrode uncoated region, a separator, and a second electrode having a second electrode coated region and a second electrode uncoated region are stacked and wound around a winding axis, wherein
   the first electrode coated region includes a first substrate and a first active material layer formed on at least one surface of the first substrate, and
   the first electrode coated region is positioned at a first curved portion formed by a first winding of the electrode assembly, and the first substrate facing the winding axis is exposed,
   wherein the electrode assembly further includes a first flat portion positioned between the first curved portion and the first electrode uncoated region, and
   wherein the first substrate positioned at the first flat portion is exposed.

6. The electrode assembly of claim 5, wherein
   the second electrode coated region includes a second substrate and a second active material layer formed on at least one surface of the second substrate, and
   the second electrode coated region is positioned at a second curved portion formed by first winding of the second electrode coated region, and the second substrate facing the winding axis is exposed.

7. The electrode assembly of claim 1, wherein
a loading level of the first electrode is 40 mg/cm$^2$.

8. The electrode assembly of claim 1, wherein
a length of the second small electrode portion is 1 mm to 4 mm.

9. The electrode assembly of claim 1, wherein
a thickness of the first electrode is 60 μm to 80 μm.

10. The electrode assembly of claim 1, wherein
a current density of the first electrode is 3.5 mA/cm$^2$.

11. The electrode assembly of claim 1, wherein
the first electrode is a positive electrode, and
the second electrode is a negative electrode.

12. The electrode assembly of any one of claim 1, further comprising
a case configured to accommodate the electrode assembly together with an electrolyte solution.

13. The electrode assembly of claim 5, wherein
a loading level of the first electrode is 40 mg/cm$^2$.

14. The electrode assembly of claim 5, wherein
a length of the second small electrode portion is 1 mm to 4 mm.

15. The electrode assembly of claim 5, wherein
a thickness of the first electrode is 60 μm to 80 μm.

16. The electrode assembly of claim 5, wherein
a current density of the first electrode is 3.5 mA/cm$^2$.

17. The electrode assembly of claim 5, wherein
the first electrode is a positive electrode, and
the second electrode is a negative electrode.

18. The electrode assembly of claim 5, further comprising
a case configured to accommodate the electrode assembly together with an electrolyte solution.

* * * * *